Feb. 9, 1954 A. VIOLET ET AL 2,668,871

DEVICE FOR AUTOMATIC FREQUENCY CONTROL, MORE PARTICULARLY FOR THE RECEPTION OF CARRIER SHIFT SIGNALS

Filed May 25, 1951 2 Sheets-Sheet 1

INVENTOR
ANDRE VIOLET
MARCEL CORNILLEAU

By R. H. Morris

ATTORNEY

INVENTOR
ANDRE VIOLET
MARCEL CORNILLEAU

By R.P. Morris
ATTORNEY

Patented Feb. 9, 1954 2,668,871

UNITED STATES PATENT OFFICE 2,668,871

DEVICE FOR AUTOMATIC FREQUENCY CONTROL, MORE PARTICULARLY FOR THE RECEPTION OF CARRIER SHIFT SIGNALS

André Violet and Marcel Cornilleau, Boulogne-Billancourt, France, assignors to International Standard Electric Corporation, New York, N. Y., a corporation of Delaware Application May 25, 1951, Serial No. 228,204

4 Claims. (Cl. 178—66)

The present invention concerns improvements in devices for automatic frequency control and particularly for the reception of signals transmitted by changes in frequency such as by the so called carrier shift frequency method.

In such systems, transmission is made by utilising a predetermined central frequency and modulating central frequency by a signal, which can take two values; e. g., by increasing and decreasing the said central frequency by a predetermined quantity. One frequency thus determined is generally designated in the art as space frequency and the other frequency is designated as mark frequency. In this type of system it is necessary that the tuning frequency of the receiving device coincides with the mean frequency from the transmitting device. Thus it is desirable to provide, in the receiving device an automatic frequency control system; especially since the two frequencies can vary independently. When the transmission is stopped for a certain time, for example on the space frequency, the automatic frequency regulating device tunes the receiving device on the space frequency. Under these conditions, when the transmission starts again, the receiving device is detuned and during the time interval which elapses between the start of the transmission and the moment at which the automatic frequency regulating device is operated, false signals result at the output of the receiving device.

One of the objects of the present invention is to provide an automatic frequency regulating device, which, without manipulation between two transmissions of messages, maintains the frequency of the local oscillator at a value such that the mean frequency of the received signal coincides continuously with the tuning frequency of the receiver.

According to one aspect of the invention, an automatic frequency regulating device applicable in particular to receiving devices of frequency modulated telegraphic signals, comprises, in combination, means for deriving from received signals, signals of constant amplitude and duration, means for detecting the presence or absence of signals and controlling in the absence of signals, the frequency of the receiving oscillator at a predetermined value with respect to the mean frequency of the signal on which the receiving device remains blocked.

According to another aspect of the invention, the means for detecting the presence or the absence of the signals comprises, in combination, a detector circuit, means for applying the constant amplitude signals to said detector circuit, the output from said detector device for blocking an electron tube in presence of signals and to render it conductive in the absence of signals, and means for utilising the output of said electron tube for controlling the automatic regulating frequency device.

The above-mentioned and other features and objects of this invention and the manner of attaining them will become more apparent and the invention itself will be best understood, by reference to the following description of an embodiment of the invention taken in conjunction with the accompanying drawings, wherein.

Figure 1:
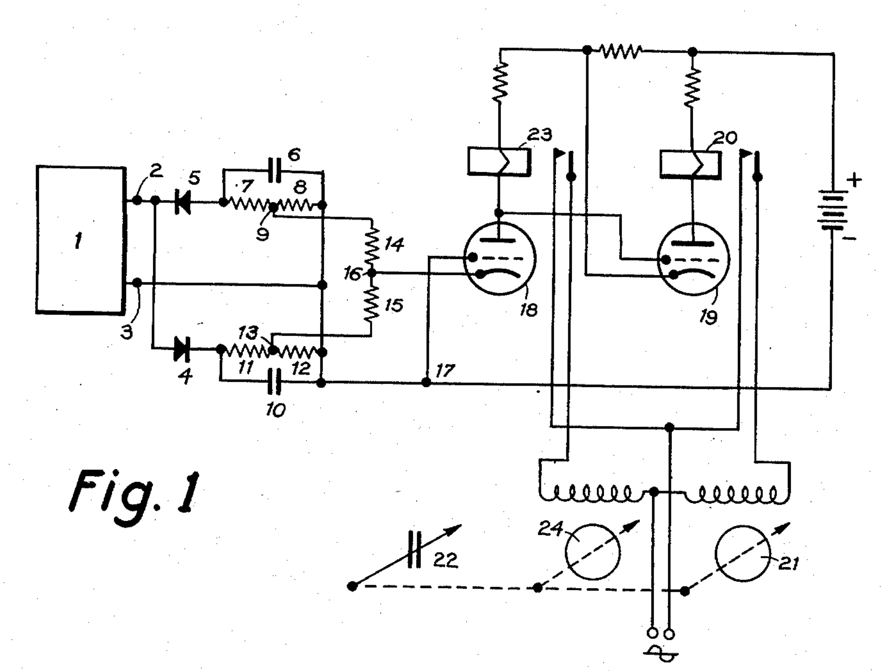
Figure 1 illustrates a well known system of automatic frequency control.
Figure 2:
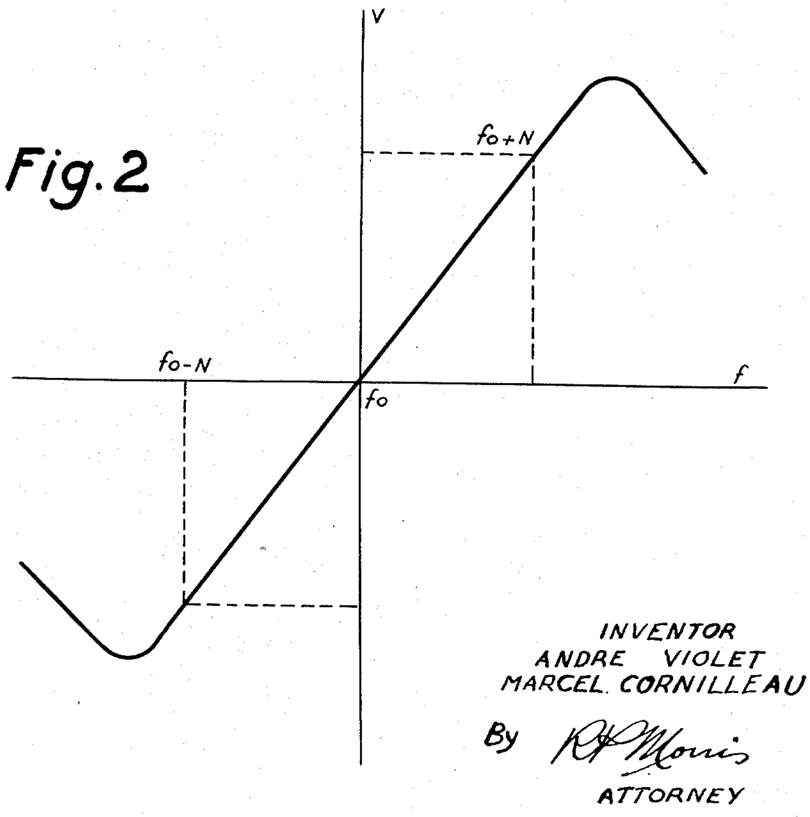
Figure 2 illustrates graphically the output of the discriminator.

In the description, the central frequency of the transmitter will be designated by $fo$; $fo+N$ being the mark frequency and $fo-N$ being the space frequency. It is assumed that when the received frequency corresponds to the mark frequency, i. e. $fo+N$, the potential of terminal 2 is higher than the potential of terminal 3 (Fig. 1) and that when the received frequency is the space frequency, i. e. $fo-N$, the potential of terminal 2 is lower than the potential of terminal 3. When the tuning frequency of the receiving system is equal to the central frequency $fo$, the signals resulting at the output of circuit 1 have a constant amplitude, their sign being a function of the frequency of the current received, $fo+N$ or $fo-N$. As the number of signals corresponding to mark frequency and space frequency vary according to the character transmitted, it is impossible to utilise the average of the voltages obtained on terminals 2 and 3 as the control voltage for the regulating device of the frequency of the local transmitter. The positive and negative impulses are rectified by the rectifiers 4 and 5 respectively. The impulses which pass through rectifier 5 charge condenser 6; the discharge current of this condenser passes through resistances 7 and 8 producing a certain voltage at point 9. In a similar way, the positive impulses which pass through rectifier 4 charges condenser 10, and the discharge current of condenser 10 passes through resistances 11 and 12, producing a certain voltage at point 13. If the local oscillator is correctly adjusted so as to make coincident the tuning frequency of the receiver with the mean frequency *fo*, the crest voltages of the impulses which pass through rectifiers 4 and 5 are equal, and no current will pass through resistances 14 and 15. Point 16 is then at the same potential as that of point 17. If the frequency, either of the oscillator or of the transmitter has varied, the crest voltages of the impulses passing through rectifiers 4 and 5 are different and a current passes through resistances 14 and 15, and a difference of potential will appear between points 16 and 17. The sense of this difference of potential is determined by the sense of the variation between the frequency of the transmitter and the frequency of the local oscillator. If point 16 is positive in relation to point 17, triode 18 is cut off and the potential on the grid of triode 19 increases in relation to the potential of the cathode, and this triode becomes conductive. The anode current passes through the winding of relay 20 which closes, by its make contact, the energisation circuit of a motor 21 which controls the variable condenser represented schematically as 22 which may be coupled to the local oscillator circuit or to a control circuit for the local oscillator, in a well known manner, so as to bring back the frequency of the local oscillator and to compensate for the drift. If point 16 is negative in relation to point 17, triode 18 becomes conductive whereas triode 19 is blocked. The anodic current of triode 18 causes the operation of relay 23 which closes by its make contact, the operating circuit of motor 24 which drives variable condenser 22 in an opposite direction so as to compensate for the drift. Both motors 21 and 24 can evidently be replaced by a single motor the direction of movement of which is controlled by contacts of relay 20 and 21. If between transmissions of signals the transmitting device remains blocked onto a frequency different from the mean frequency, for example on the space frequency, there appears a difference of potential between points 9 and 13 and thus between points 16 and 17, and the frequency regulating device has a tendency to bring back the frequency of the local oscillator so as to tune the receiving device on "space" frequency. However, this presents certain drawbacks: in particular, in the absence of manipulation, the impulsive voltages due to radioelectric noises can give rise to false signals which trigger relays of the teleprinter. On the other hand, when after a rather long period during which the transmitting device has remained blocked on space frequency (or mark frequency) a certain lapse of time is necessary after resuming the transmission for regulating the frequency of the oscillators. Errors can occur during this period.

Figure 3:
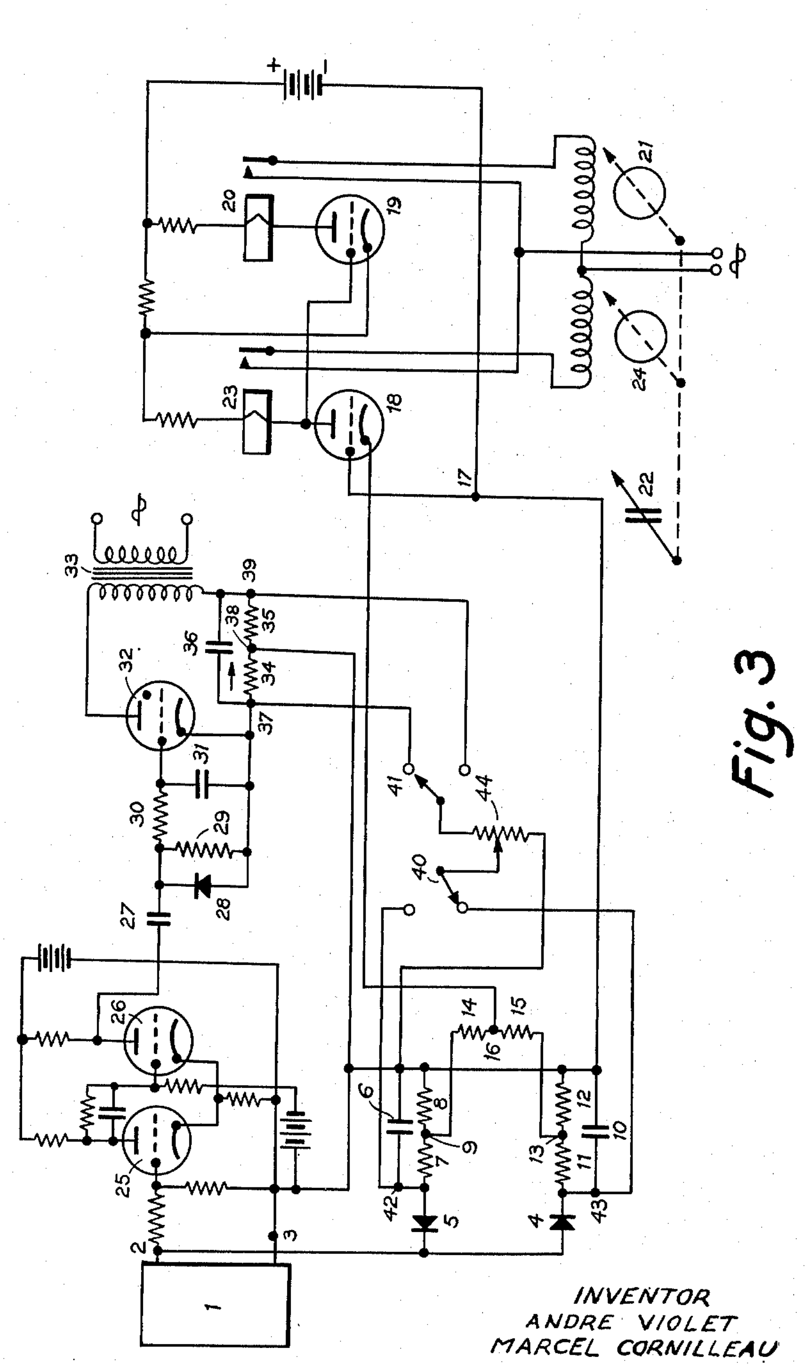
Figure 3 illustrates an automatic frequency control system incorporating the features of the invention.

Referring now to Fig. 3, there is shown a system which in accordance with the invention, causes the frequency of the receiving device to automatically return to a frequency corresponding to the central frequency. The elements of Fig. 3 which have the same function as the corresponding elements in Fig. 1 have been indicated by the same reference numerals. A portion of the output current from the discriminator circuit 1 is applied to the regulating circuit comprising rectifiers 4 and 5, condensers 6 and 10, and resistances 7, 8, 11 and 12 as explained in relation to Figure 1. The other portion of output current from the discriminator 1 is applied to the input terminals of flip-flop circuit comprising triodes 25 and 26 and associated elements. The flip-flop circuit which has two equilibrium positions gives at its output a rectangular impulse each time it receives an impulse from discriminator circuit 1. The output signals of the discriminator are thus reproduced in the shape of constant amplitude signals. The output signals of the flip-flop circuit are detected by means of the circuit comprising condenser 27, rectifying cell 28 and resistance 29, the detected current being then filtered by an integrating circuit comprising resistance 30 and condenser 31 before being transmitted to grid of electronic tube 32 which can be a vacuum tube or a gas tube. Tube 32 is fed alternating current by means of a transformer 33. In the absence of manipulation signals, tube 32 is conductive during one half cycle of the alternating voltage transmitted to it by means of transformer 33. The direct current passes through resistances 34 and 35 while the alternating component of the current is by-passed by condenser 36. A voltage appears between points 37 and 38 and between points 38 and 39; if resistances 34 and 35 are equal, the differences of potential between 37 and 38, and 38 and 39 are equal. By means of change over switch 41, the one of these two voltages which has a suitable polarity, either to point 42 or to point 43, is applied according to the relative setting of mark frequency and space frequency of the transmitter. According to the position of switches 40 and 41 the potential at point 37 or point 39 is applied either to point 42 or to point 43. If it is assumed that switches 40 and 41 are in the position represented on Figure 3 a current passes through resistances 11 and 12 and the potential of point 16 is maintained at a predetermined value in relation to the potential corresponding to the continuous reception of space frequency. When the manipulation is resumed, tube 32 is blocked and the regulating voltage disappears.

As it is assumed that the frequency shift remains constant for a given transmitter, the signal and value of the regulating voltage taken on terminals of potentiometer 44 are determined by the amplitude of the frequency shift in relation to the mean frequency and by the frequency on which the transmitter remains blocked in the absence of manipulation. If in the absence of manipulation the frequency of the transmitter varies, the regulating device operates and makes coincident the tuning frequency of the receiving device with the mean frequency of the transmitter, thus avoiding false signals and errors which would otherwise occur at the start of the reception of the new signals.

While the principles of the invention have been described above in connection with specific embodiments, and particular modifications thereof, it is to be clearly understood that this description is made only by way of example and not as a limitation on the scope of the invention.

What is claimed is:

1. In a frequency shift signal system wherein intelligence is transmitted by alternate pulses of two different frequencies lying on opposite sides of a central frequency, and having a receiver comprising, a regulating circuit for deriving voltages of opposite polarity in response to receipt of said respective frequencies, a local oscillator coupled to the output of said regulating circuit and tunable in opposite directions toward said central frequency in response to the sum of said voltages, a circuit for correcting the tuning of said oscillator for departures from said central frequency due to predominance of one of said frequencies comprising means having an output circuit coupled to said regulating circuit and responsive to receipt of continued pulses of said one frequency for producing an output voltage of a predetermined magnitude, and means for applying said output voltage to said regulating circuit in opposed polarity to said derived voltage produced by said one frequency.

2. The system according to claim 1, wherein the two different frequencies correspond to the mark and space telegraph signals respectively, said regulating circuit comprising a first circuit operative in response to said mark signals for producing a first voltage of given polarity, a second circuit operative in response to said space signals for producing a second voltage of opposite polarity and means for applying said output voltage in opposite polarity to the voltage of one of said circuits during the predominance of one of said frequencies to correct the tuning of said oscillator.

3. The system according to claim 1 wherein said continued pulse responsive means comprises an electron tube, an output circuit coupled to said tube for producing said voltage of predetermined magnitude when said tube is conducting, means responsive to the receipt of said two different frequencies for rendering said tube non-conducting, and means responsive to the predominance of one of said frequencies for rendering said tube conducting.

4. The system according to claim 3, wherein said electron tube comprises cathode, control grid and anode electrodes, an integrator circuit for receiving said pulses coupled in the cathode-grid circuit of said tube, means for normally biasing said tube to cut-off, said integrator circuit producing a voltage sufficient to overcome said bias upon receiving said predominant frequency for a given time, said given time being determined by the time constant of said integrator circuit.

ANDRÉ VIOLET.
MARCEL CORNILLEAU.

References Cited in the file of this patent

UNITED STATES PATENTS

| Number | Name | Date |
|---|---|---|
| 2,495,326 | Hansell | Jan. 24, 1940 |
| 2,477,962 | Chapin | Aug. 2, 1949 |
| 2,477,963 | Chapin | Aug. 2, 1949 |
| 2,541,128 | Violet | Feb. 13, 1951 |